(12) United States Patent
Ohashi et al.

(10) Patent No.: US 8,651,673 B2
(45) Date of Patent: Feb. 18, 2014

(54) VEHICLE MIRROR DEVICE

(75) Inventors: Masatsugu Ohashi, Aichi-ken (JP);
Takashi Ichikawa, Aichi-ken (JP)

(73) Assignee: Kabushiki Kaisha Tokai-Rika-Denki-Seisakusho, Aichi-Ken (JP)

(*) Notice: Subject to any disclaimer, the term of this patent is extended or adjusted under 35 U.S.C. 154(b) by 121 days.

(21) Appl. No.: 13/346,064

(22) Filed: Jan. 9, 2012

(65) Prior Publication Data
US 2012/0176696 A1     Jul. 12, 2012

(30) Foreign Application Priority Data
Jan. 12, 2011   (JP) .................. 2011-004204

(51) Int. Cl.
*G02B 7/18*    (2006.01)
(52) U.S. Cl.
USPC ........................................... 359/513
(58) Field of Classification Search
USPC .................. 359/513, 514; 362/494
See application file for complete search history.

(56) References Cited

U.S. PATENT DOCUMENTS 5,851,064 A * 12/1998 Lyons ........................ 362/494

FOREIGN PATENT DOCUMENTS

| DE | 10143976 A1 | 4/2003 |
|---|---|---|
| JP | 2001-341581 | 12/2001 |
| JP | 2004-004277 | 1/2004 |
| JP | 2004-314705 | 11/2004 |
| WO | 9900272 A1 | 1/1999 |
| WO | 2006067536 A1 | 6/2006 |

* cited by examiner

*Primary Examiner* — Euncha Cherry
(74) *Attorney, Agent, or Firm* — Roberts Mlotkowski Safran & Cole P.C.

(57) ABSTRACT

Efficiently suppressing chatter of a mirror face of a mirror. In a vehicle door mirror device, a case is disposed at a back face side of a mirror, a substrate unit is accommodated in the case, gap between the mirror and the case is sealed by sealing agent, thereby sealing the substrate unit. The holder, the case and the sealing agent are integrated together. A press contact tab is integrally provided to a housing box of the holder such that the press contact tab makes press contact with an anti-vibration pillar. The supporting rigidity to the mirror at the position of the substrate unit can accordingly be efficiently raised, vibration of the mirror due to the substrate unit can be efficiently suppressed, and chatter of a mirror face of the mirror can be efficiently suppressed.

8 Claims, 5 Drawing Sheets

VEHICLE MIRROR DEVICE

CROSS-REFERENCE TO RELATED APPLICATION

This application claims priority under 35 USC 119 from Japanese Patent Application No. 2011-004204 filed Jan. 12, 2011, the disclosure of which is incorporated by reference herein.

BACKGROUND OF THE INVENTION

1. Field of the Invention

The present invention relates to a vehicle mirror device in which a vehicle mirror is retained by a retaining member.

2. Related Art

In an electrochromic glare-proof mirror (anti-glare mirror) described in Japanese Patent Application Laid-Open (JP-A) No. 2004-4277, a mirror base and a mirror rim are provided on the back face side of a mirror body, and a connector and a supply terminals are disposed between the mirror body and the mirror base and the mirror rim. An adhesive agent is also provided between the mirror body and the mirror base and the mirror rim, with the adhesive agent sealing the connector and the supply terminal.

In the electrochromic glare-proof mirror, there is a possibility of the mirror body readily vibrating due to the mass of the connector and supply terminal. Vibration of the mirror body can be suppressed and chatter of the mirror face of the mirror body can be suppressed the higher support rigidity achieved to the mirror body at a position of the connector and supply terminal.

SUMMARY OF THE INVENTION

In consideration of the above circumstances the present invention provides a vehicle mirror device capable of efficiently suppressing chatter of a mirror face of a mirror.

A vehicle mirror device of a first aspect of the present invention includes: a retaining member, provided at a back face side of a vehicle mirror, that retains the mirror; a supply section, provided at the back face side of the mirror, to which electrical power is supplied; a seal portion, integrally provided at the retaining member, that seals the supply section; and a press contact portion that is integrally provided at at least one of the seal portion or a portion, which is integrated with the seal portion, of the retaining member, the press contact portion making press contact with a member provided at a vehicle body side.

A vehicle mirror device of a second aspect of the present invention is the vehicle mirror device of the first aspect wherein the mirror and the seal portion are integrated together.

A vehicle mirror device of a third aspect of the present invention is the vehicle mirror device of the first aspect or the second aspect wherein the seal portion includes: a first seal portion that covers the supply section; and a second seal portion that covers the first seal portion.

It is possible that the first seal portion is a case that accommodates the supply section; and the second seal portion is a sealing agent having adhesive and sealing properties.

A vehicle mirror device of a fourth aspect of the present invention is the vehicle mirror device of the second or third aspect wherein an end face, at a side of the mirror, of the seal portion is fitted to the back face of the mirror.

A vehicle mirror device of a fifth aspect of the present invention includes: a retaining member, provided at a back face side of a vehicle mirror, that retains the mirror; a supply section, provided at the back face side of the mirror, to which electrical power is supplied; and a seal portion, integrally provided at the retaining member, that seals the supply section, wherein a portion, which is integrated with the seal portion, of the retaining member is integrally overlapped with a member provided at a vehicle body side.

In the vehicle mirror device of the first aspect, the retaining member is provided at the back face side of the vehicle mirror and the retaining member retains the mirror. The supply section is provided at the back face side of the mirror and electrical power is supplied to the supply section. The supply section is sealed with the seal portion.

The seal portion is provided to integrate to the retaining member, and the press contact portion is integrally provided to the seal portion and/or a portion, which is integrated to the seal portion, of the retaining member, the press contact portion makes press contact with the member provided to the vehicle body side. The supporting rigidity to the mirror at a position of the supply section can accordingly be efficiently raised, vibration of the mirror due to the supply section can be efficiently suppressed, and chatter of the mirror face of the mirror can be efficiently suppressed.

In the vehicle mirror device of the fifth aspect, the seal portion is provided to integrate to the retaining member, and the portion, which is integrated to the seal portion, of the retaining member is integrally overlapped to the member provided to a vehicle body side. The supporting rigidity to the mirror at a position of the supply section can accordingly be efficiently raised, vibration of the mirror due to the supply section can be efficiently suppressed, and chatter of the mirror face of the mirror can be efficiently suppressed.

In the vehicle mirror device of the second aspect of the present invention the mirror and the seal portion are integrated together. The support rigidity to the mirror at the position of the supply section can accordingly be even more efficiently raised, vibration of the mirror due to the supply section can be even more efficiently suppressed, and chatter of the mirror face of the mirror can be even more efficiently suppressed.

In the vehicle mirror device of the third aspect of the present invention the seal portion includes the first seal portion that covers the supply section, and the second seal portion that covers the first seal portion. The support rigidity to the mirror at the position of the supply section can accordingly be even more efficiently raised, vibration of the mirror due to the supply section can be even more efficiently suppressed, and chatter of the mirror face of the mirror can be even more efficiently suppressed.

In the vehicle mirror device of the fourth aspect of the present invention, due to the mirror side end face of the seal portion being fitted (joined) to the back face of the mirror, the mirror and the seal portion can be strongly integrated together. The support rigidity to the mirror at the position of the supply section can accordingly be even more efficiently raised, vibration of the mirror due to the supply section can be even more efficiently suppressed, and chatter of the mirror face of the mirror can be even more efficiently suppressed.

BRIEF DESCRIPTION OF THE DRAWINGS

Exemplary embodiments of the present invention will be described in detail based on the following figures, wherein.

DETAILED DESCRIPTION OF THE INVENTION

First Exemplary Embodiment

Figure 2:
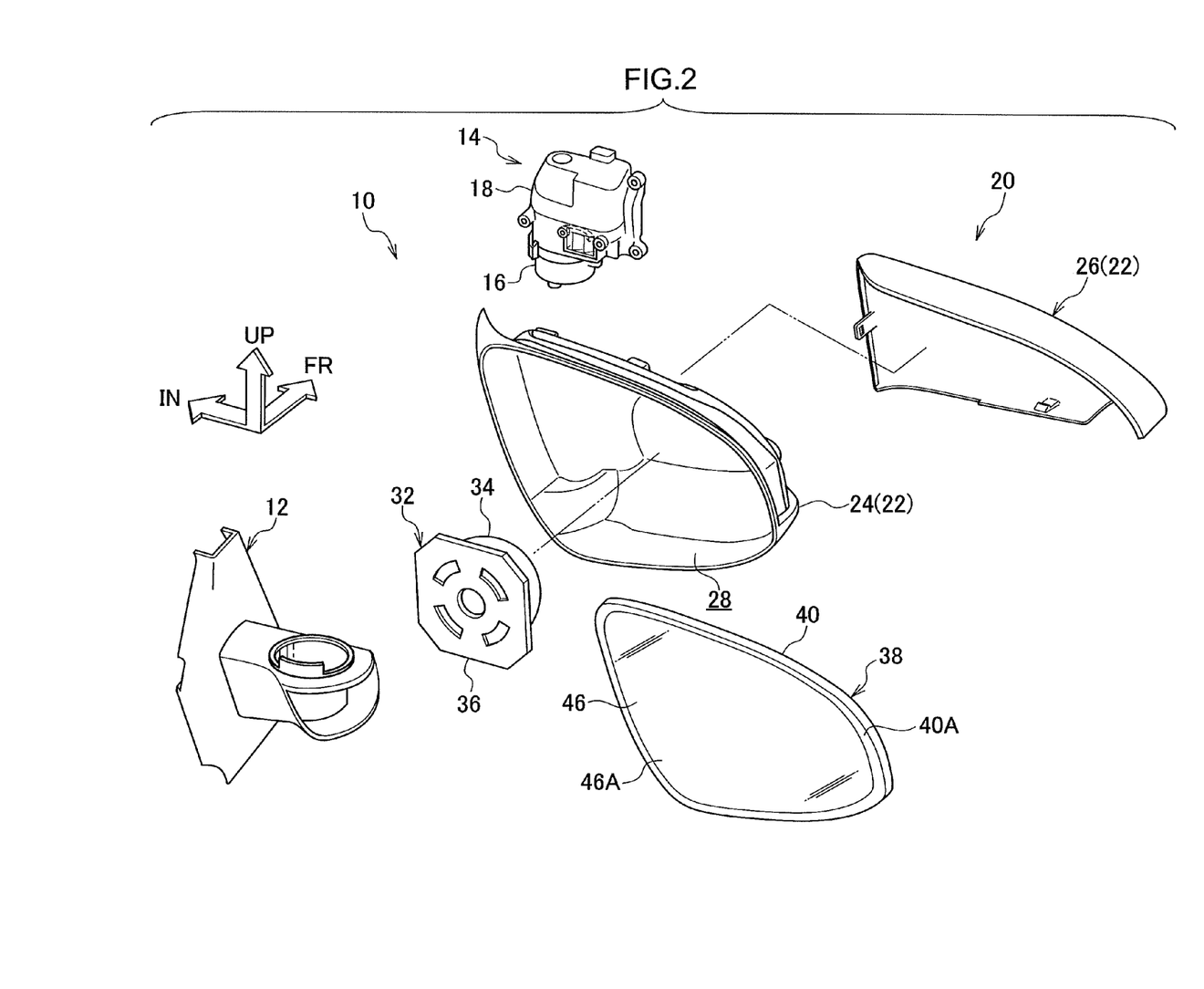
FIG. 2 is an exploded perspective view illustrating a vehicle door mirror device according to the first exemplary embodiment of the present invention as viewed from diagonally above and to the rear of a vehicle.

FIG. 2 is an exploded perspective diagram illustrating a vehicle door mirror device 10 according to a first exemplary embodiment, in which the present invention is applied to a vehicle door mirror device, as viewed from diagonally above and to the rear of a vehicle. In the drawings the vehicle front direction is indicated by arrow FR, the vehicle width direction inside direction (the vehicle left hand side direction) is indicate by arrow IN, and the top direction is indicated by arrow UP.

The vehicle door mirror device 10 according to the present exemplary embodiment is provided externally to a top-down direction intermediate portion at a vehicle front-side end of a vehicle door (not shown in the drawings).

As shown in FIG. 2, the vehicle door mirror device 10 includes a resin stay 12 serving as a support member at a vehicle width direction inside end portion of the vehicle door mirror device 10. The stay 12 is attached to the vehicle door.

A housing device 14 (retractor) serving as a housing section is supported on the stay 12. The housing device 14 is provided with a metal stand 16 serving as a support member, with the housing device 14 supported by the stay 12 by the bottom end portion of the stand 16 being fixed to the stay 12. The stand 16 supports a drive body 18 configuring a rotating body and the drive body 18 rotates (swings) with respect to the stand 16 when the housing device 14 is driven.

The drive body 18 of the housing device 14 supports a main body section 20 configuring the rotating body, and a resin visor 22 configuring a support body is provided to the main body section 20.

The visor 22 is provided with a visor body 24 (rigid member) serving as a visor body, and the vehicle width direction inside portion of the visor body 24 is fixed to the drive body 18 at the vehicle front-side. The visor 22 is accordingly supported by the drive body 18, and the main body section 20 is accordingly supported by the drive body 18, the main body section 20 is capable of rotating as one (integrally) with the drive body 18.

A curved plate shaped visor cover 26 serving as a covering member is provided at the vehicle front-side of the visor body 24. The visor cover 26 is assembled to the visor body 24. The visor cover 26 accordingly covers the vehicle front-side of the visor body 24, and the drive body 18 is accommodated between the visor cover 26 and the visor body 24.

The main body section 20 is arranged in a deployed position (open position) with the main body section 20 projecting out from the stay 12 towards the vehicle width direction outside, to as to be deployed (opened). By driving the housing device 14, the main body section 20 is rotated (swung) as one with the drive body 18 from the deployed position in a housing direction (towards the vehicle rear-side and towards the vehicle width direction inside), such that the main body section 20 (including a mirror 46, described below) is arranged in a housing position so as to be housed (rear-housed). Further, when the housing device 14 is driven (from the housed state), the main body section 20 is rotated (swung) as one with the drive body 18 from the housing position in a deployment direction (towards the vehicle front-side and towards the vehicle width direction outside), and the main body section 20 (including the mirror 46, described below) is returned to the deployed position to be deployed.

A substantially rectangular box shaped accommodating compartment 28 is formed at a vehicle rear-side portion of the visor body 24. The face on the vehicle rear-side of the accommodating compartment 28 is open. A pillar shaped anti-vibration pillar 30 (rigid member) serving as a vibration suppressing (damping) member (at vehicle side) configuring a vibration suppressing (damping) section (see FIG. 1) is integrally provided at a vehicle width direction outside portion on the bottom face (the vehicle front-side) inside the accommodating compartment 28. The anti-vibration pillar 30 extends out from the bottom face inside the accommodating compartment 28 towards the vehicle rear-side. The rigidity of the anti-vibration pillar 30 is high, and the support rigidity for the anti-vibration pillar 30 by the bottom wall of the accommodating compartment 28 is also high. The vehicle width direction inside edge of the leading end of the anti-vibration pillar 30 is configured by an anti-vibration portion 30A. The anti-vibration portion 30A curves such that a center of tilting of a mirror body 38, described below, is a center of the curve of the anti-vibration portion 30A.

A mirror face (mirror finished surface) adjustment device 32 (drive unit) serving as a mirror face adjustment section configuring a support body is provided at a central portion inside the accommodating compartment 28.

A fixing section 34 is provided at the vehicle front-side of the mirror face adjustment device 32. The peripheral wall (rigid member) of the fixing section 34 has high rigidity. The fixing section 34 is fixed to the bottom wall of the accommodating compartment 28, and the mirror face adjustment device 32 is thereby supported by the visor body 24.

A resin plate shaped tilt plate 36 (rigid member) is supported at the vehicle rear-side of the fixing section 34. The rigidity of the tilt plate 36 is high. The tilt plate 36 tilts with respect to the fixing section 34 when the mirror face adjustment device 32 is driven.

The mirror body 38 is detachably assembled to the tilt plate 36. The mirror body 38 is capable of tilting as one (integrally) with the tilt plate 36 and is accommodated inside the accommodating compartment 28 of the visor body 24.

Figure 1:
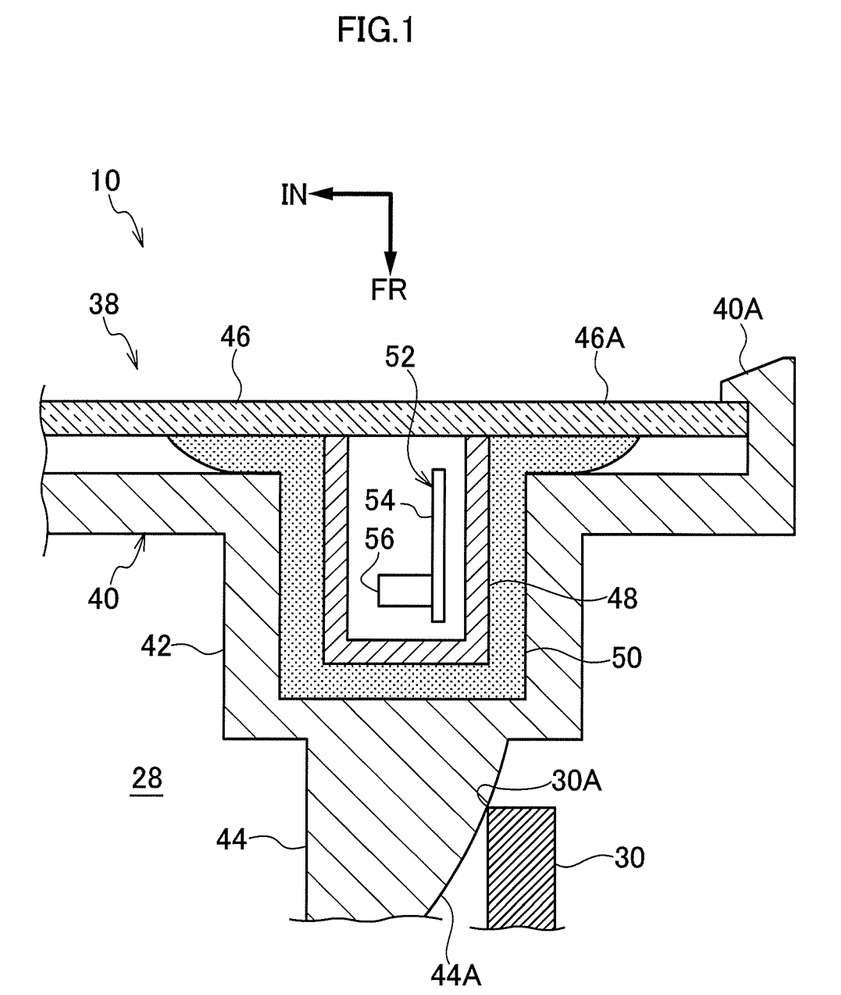
FIG. 1 is a cross-section illustrating main portions of a vehicle door mirror device according to a first exemplary embodiment of the present invention.

As shown in FIG. 1 and FIG. 2, a substantially rectangular plate shaped holder 40 (holder arm) formed from resin is provided to a vehicle front-side portion of the mirror body 38. The mirror body 38 is assembled to the tilt plate 36 by assembling the holder 40 to the tilt plate 36. An L-shaped cross-section rim section 40A is integrally formed around the entire periphery of the holder 40. The rim section 40A projects out from the holder 40 towards the vehicle rear-side, and a portion at the leading end side of the rim section 40A extends towards the center of the holder 40.

A housing box 42 serving as a covering portion is integrally formed to a vehicle width direction outside portion of the holder 40. The inside of the housing box 42 is open towards the vehicle front-side.

The bottom face of the housing box 42 is integrally formed with a press contact tab (pawl) 44 (rigid member) serving as a press contact portion configuring a vibration suppressing (damping) section. The rigidity of the press contact tab 44 is high. The press contact tab 44 extends out from the housing box 42 towards the vehicle front-side. The press contact tab 44 makes press contact with the anti-vibration portion 30A of the anti-vibration pillar 30 of the visor body 24. A press contact face 44A of the press contact tab 44, with the anti-vibration portion 30A, is a spherical profiled face whose center is on the center of tilting of the mirror body 38. The press contact face 44A slides against the anti-vibration portion 30A when the mirror body 38 is being tilted, maintaining press contact of the press contact face 44A to the anti-vibration portion 30A.

A flat plate shaped mirror 46 is inserted into the rim section 40A of the holder 40. The mirror 46 is fixed inside the rim section 40A in a state in which the mirror 46 is fitted (joined) in the base end side portion of the rim section 40A and is anchored by a the leading end side portion of the rim section 40A. A mirror face (mirror finished surface) 46A (front face) of the mirror 46 faces towards the vehicle rear-side, and the angle of the mirror face 46A of the mirror 46 is adjusted by driving the mirror face adjustment device 32 so as to tilt the mirror body 38.

A box shaped case 48 serving as a first seal portion configuring a sealing section is disposed at the back face side (vehicle front-side) of the mirror 46. The inside of the case 48 is open towards the vehicle rear-side (the mirror 46 back face side of the case 48 is open). The vehicle rear-side end face of the case 48 has a flat plane profile, and the case 48 is integrated to the mirror 46 by the vehicle rear-side end face of the case 48 being bonded and fitted (joined) to the back face of the mirror 46, such as with double-sided adhesive tape serving as an adhesive member. The case 48 has sealing ability and is inserted into the housing box 42 of the holder 40.

A sealing agent 50 (adhesive agent) serving as a second seal portion configuring the sealing section is filled (applied), between the holder 40 (including the housing box 42) and the mirror 46 and the case 48, in the entire of gap between the holder 40 and the mirror 46 around the entire periphery of the case 48, and in the entire of gap between the holder 40 and the case 48. The sealing agent 50 is hardened (cured). The sealing agent 50 is to be silicone or the like so as to have has both adhesive and sealing properties. The sealing agent 50 is bonded (adhered) and fitted (joined) to the holder 40, the mirror 46 and the case 48, such that the sealing agent 50 is integrated to the holder 40, the mirror 46 and the case 48. The sealing agent 50 covers and seals between the mirror 46 and the entire periphery of the case 48, such that the inside of the case 48 is sealed.

A substrate unit 52 serving as a supply section is accommodated and fixed inside the case 48. The substrate unit 52 is sealed (against water and the like) by being sealed inside the case 48 as described above. An operation mechanism 56 is integrally provided to a substrate 54 in the substrate unit 52. Electrical power is supplied to the substrate unit 52, and the operation mechanism 56 is operated under control from the substrate 54. The operation mechanism 56 is configured, for example, by a light emitting device (light device) or light receiving device (light detector device, camera), and is capable of emitting light or receiving light through a transparent section, facing towards the inside the case 48, of the mirror 46.

Explanation follows regarding operation of the present exemplary embodiment.

In the vehicle door mirror device 10 configured as explained above, when the mirror face adjustment device 32 is driven, the tilt plate 36 tilts with respect to the fixing section 34, thereby tilting the mirror body 38 integrally to the tilt plate 36, and accordingly adjusting the angle of the mirror face 46A of the mirror 46.

When the mirror body 38 is tilted, the press contact face 44A of the press contact tab 44 that is integrated to the holder 40 slides against the anti-vibration portion 30A of the anti-vibration pillar 30 that is integrated to the visor body 24, with press contact of the press contact tab 44 (the press contact face 44A) to the anti-vibration pillar 30 (the anti-vibration portion 30A) being maintained.

The case 48 is disposed at the back face side of the mirror 46, and the substrate unit 52 is accommodated in the case 48, a portion between the mirror 46 and the case 48 is sealed with the sealing agent 50, the inside of the case 48 is sealed, accordingly, the substrate unit 52 is sealed. The substrate unit 52 is thereby sealed using a simple configuration, and hence a reduction in cost and reduction in weight is achieved.

There is relatively large weight at a position, corresponding to the substrate unit 52, of the mirror body 38, and so vibration is readily induced in the mirror body 38 due to the weight of the substrate unit 52.

Here, the sealing agent 50 bonds the holder 40 (including the housing box 42) and the case 48, integrating together the holder 40, the case 48 and the sealing agent 50. The press contact tab 44 is also integrally provide to the housing box 42 (a portion integrated to the sealing agent 50), and the press contact tab 44 is in press contact with the anti-vibration pillar 30 of the visor body 24. The support rigidity to the mirror 46 at the position of the substrate unit 52 can accordingly be efficiently raised, vibration of the mirror 46 due to the substrate unit 52 can be efficiently suppressed, and chatter of the mirror face 46A of the mirror 46 can be efficiently suppressed. Accordingly, not only can a reduction in visibility with the mirror 46 during vehicle travel be efficiently suppressed, but it is also possible to achieve a reduction in weight of the anti-vibration pillar 30 and the press contact tab 44, and possible to eliminate a requirement to provide another vibration suppressing member.

Furthermore, the case 48 and the sealing agent 50 are bonded to the mirror 46, and the mirror 46, the case 48 and the sealing agent 50 are integrated together. The support rigidity of the mirror 46 at the position of the substrate unit 52 can accordingly be even more efficiently raised, vibration of the mirror 46 due to the substrate unit 52 can be even more efficiently suppressed, and chatter of the mirror face 46A of the mirror 46 can be even more efficiently suppressed.

Further, due to the vehicle rear-side end faces of the case 48 and the sealing agent 50 fitting (joining) to the back face of the mirror 46, the mirror 46 can be strongly integrated to the case 48 and the sealing agent 50. The support rigidity of the mirror 46 at the position of the substrate unit 52 can accordingly be even more efficiently raised, vibration of the mirror 46 due to the substrate unit 52 can be even more efficiently suppressed, and chatter of the mirror face 46A of the mirror 46 can be even more efficiently suppressed.

Furthermore, the substrate unit 52 is covered by the case 48 and the case 48 is covered by the sealing agent 50 and the sealing agent 50 is covered by the housing box 42. Accordingly, a portion of the mirror body 38, corresponding to the case 48, the sealing agent 50 and the housing box 42, is configured with a large cross-sectional area perpendicular to the direction from the mirror 46 towards the press contact tab 44 (the vehicle front-rear direction), raising rigidity. The support rigidity of the mirror 46 at the position of the substrate unit 52 can accordingly be even more efficiently raised, vibration of the mirror 46 due to the substrate unit 52 can be even more efficiently suppressed, and chatter of the mirror face 46A of the mirror 46 can be even more efficiently suppressed.

Figure 4:
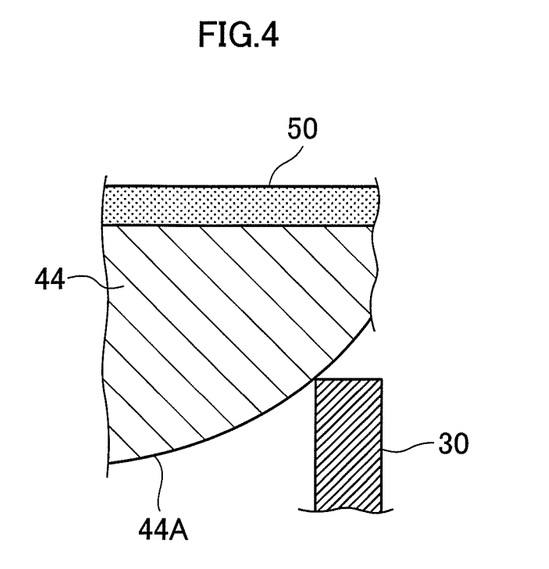
FIG. 4 is a cross-section illustrating main portions of a vehicle door mirror device according to a modified example of the first exemplary embodiment of the present invention.
Figure 5:
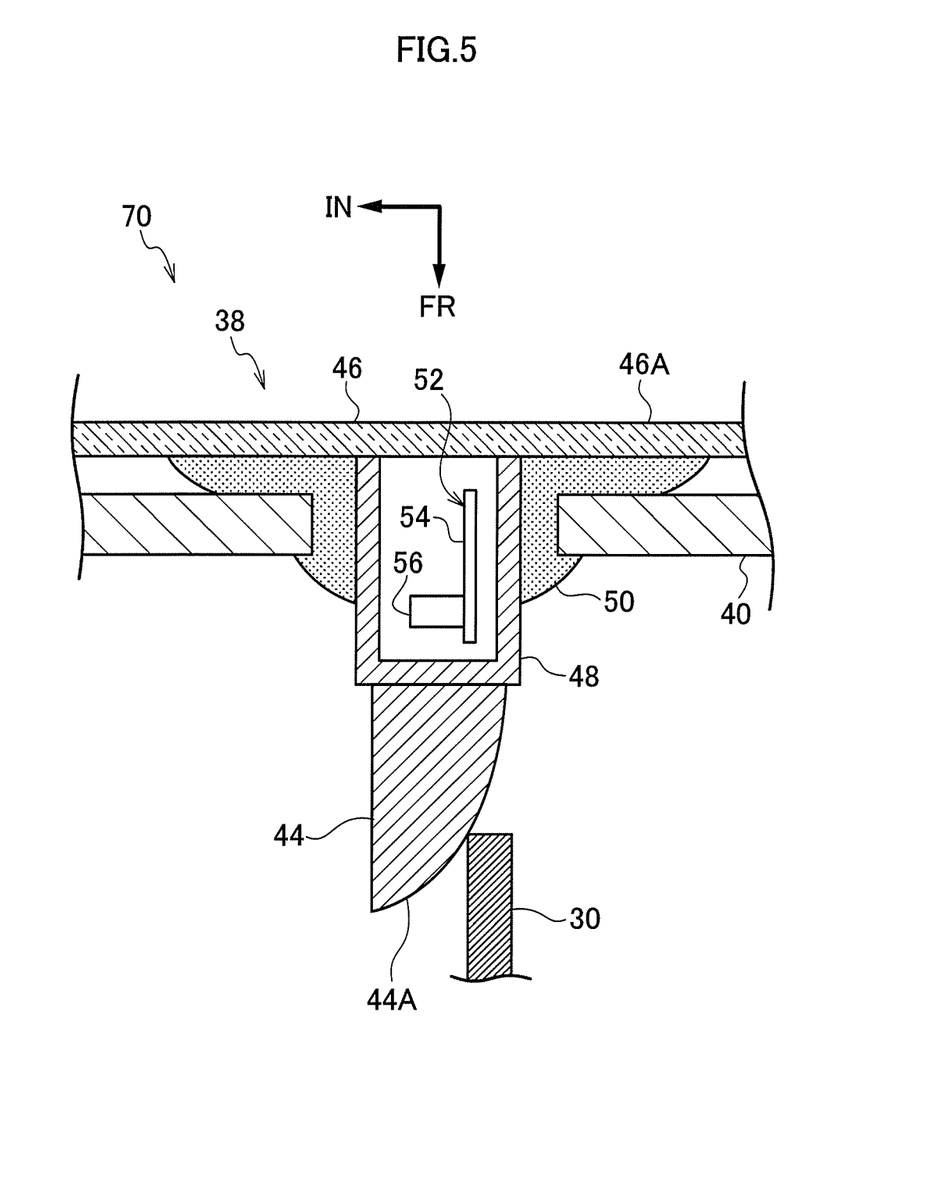
FIG. 5 is a cross-section illustrating main portions of a vehicle door mirror device according to a modified example of the first exemplary embodiment of the present invention.

In the present exemplary embodiment, the press contact tab 44 is integrally provided to the housing box 42 of the holder 40, however configuration may be made such that the press contact tab 44 is integrally provided to a portion, integrated to the sealing agent 50, of the holder 40 (at which portion is integrated to the sealing agent 50) and/or integrally provided to the sealing agent 50 (the case 48) (FIGS. 4 and 5).

In the present exemplary embodiment the anti-vibration pillar 30 is integrally provided to the visor body 24, however configuration may be made such that the anti-vibration pillar 30 is integrally provided to the mirror face adjustment device 32 at the peripheral wall of the fixing section 34.

Second Exemplary Embodiment

Figure 3:
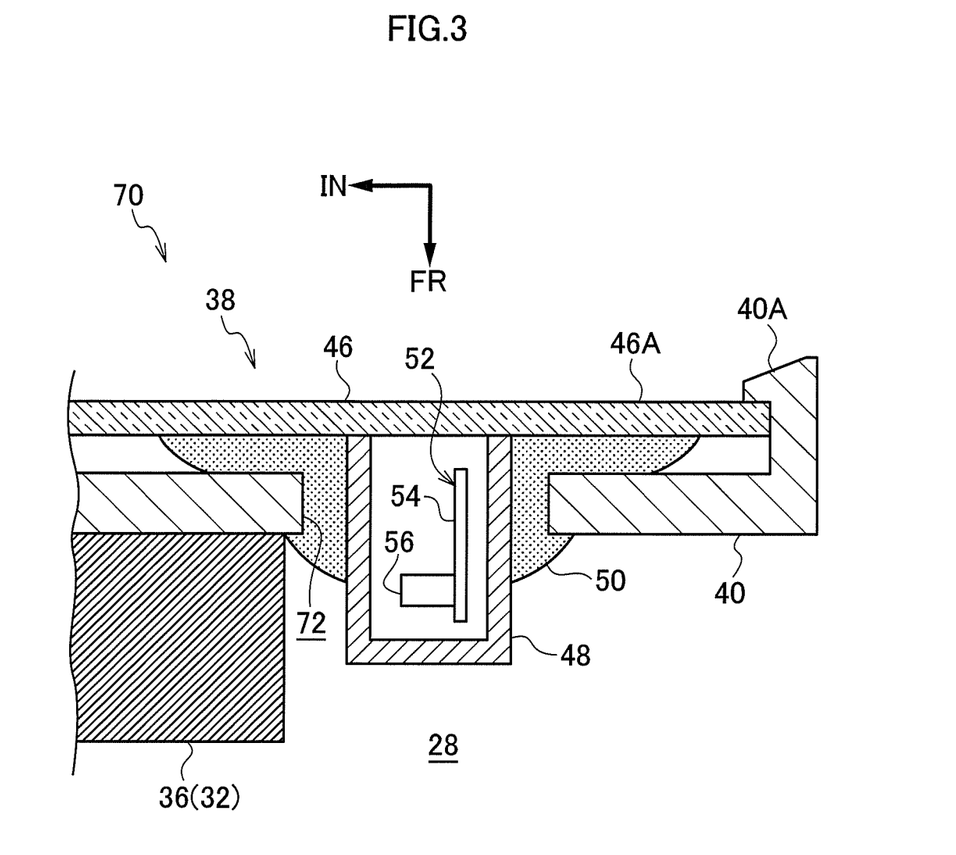
FIG. 3 is a cross-section illustrating main portions of a vehicle door mirror device according to a second exemplary embodiment.

FIG. 3 illustrates a cross-section of main portions of a vehicle door mirror device 70 according to a second exemplary embodiment.

The vehicle door mirror device 70 according to the second exemplary embodiment is of substantially the same configuration as that of the first exemplary embodiment, however it differs in the following aspects.

The anti-vibration pillar 30, the housing box 42 and the press contact tab 44 of the first exemplary embodiment are not provided in the vehicle door mirror device 70 according to the second exemplary embodiment.

In a mirror body 38, a placement hole 72 is formed so as to pass through a vehicle width direction outside portion of the holder 40. A case 48 is disposed so as to pass through the placement hole 72.

Sealing agent 50 between the holder 40, a mirror 46 and the case 48 is filled (applied) in the entire of gap between the holder 40 and the mirror 46 around the entire periphery of the case 48, and filled in the entire of gap between the entire periphery of the placement hole 72 of the holder 40 and the case 48, and filled in the vehicle front-side of the holder 40 around the entire periphery of the case 48. The sealing agent 50 is hardened (cured). The sealing agent 50 is bonded (adhered) and fitted (joined) to the holder 40, the mirror 46 and the case 48, and the sealing agent 50 is integrated to the holder 40, the mirror 46 and the case 48. The sealing agent 50 covers and seals between the mirror 46 and the entire periphery of the case 48, thereby sealing the inside of the case 48.

A tilt plate 36 (vehicle body side) of the mirror face adjustment device 32 is increased in size relative to the first exemplary embodiment, and approaches the sealing agent 50 (contact may be made with the sealing agent 50), and the tilt plate 36 is integrally overlapped (or polymerized) with a portion of the holder 40, that is integrated to the sealing agent 50 (at which portion is integrated to the sealing agent 50).

As described above, the tilt plate 36 is integrally overlapped with the portion of the holder 40 that is integrated to the sealing agent 50. The support rigidity to the mirror 46 at the position of the substrate unit 52 can accordingly be raised, vibration of the mirror 46 due to the substrate unit 52 can be suppressed, and chatter of the mirror face 46A of the mirror 46 can be suppressed.

Furthermore, the case 48 and the sealing agent 50 are adhered to the mirror 46, integrating the mirror 46 to the case 48 and the sealing agent 50. The support rigidity to the mirror 46 at the position of the substrate unit 52 can accordingly be raised well, vibration of the mirror 46 due to the substrate unit 52 can be suppressed well, and chatter of the mirror face 46A of the mirror 46 can be suppressed well.

However, due to the vehicle rear-side end faces of the case 48 and the sealing agent 50 fitting (joining) to the back face of the mirror 46, the mirror 46, the case 48 and the sealing agent 50 can be strongly integrated together. The support rigidity of the mirror 46 at the position of the substrate unit 52 can accordingly be even better raised, vibration of the mirror 46 due to the substrate unit 52 can be even better suppressed, and chatter of the mirror face 46A of the mirror 46 can be even better suppressed.

Whereas in the first exemplary embodiment and the second exemplary embodiment the mirror 46 is configured with a flat plane profile, the mirror 46 may be configured such that the back face of the mirror 46 is curved in a curved plate profile mirror 46. In such cases, the mirror 46 and the case 48 can be as strongly integrated together by curving the vehicle rear-side end face of the case 48 so as to follow the back face of the mirror 46, and fitting (joining) the case 48 to the back face of the mirror 46.

Whereas in the first exemplary embodiment and the second exemplary embodiment the vehicle mirror device of the present invention is applied to the vehicle door mirror device 10 or 70, the vehicle mirror device of the present invention may also be applied to another external vehicle mirror device (such as a vehicle fender mirror device) outside a vehicle, or to an internal vehicle mirror device inside a vehicle.

What is claimed is:

1. A vehicle mirror device comprising:
a retaining member, provided at a back face side of a vehicle mirror, that retains the mirror;
a supply section, provided at the back face side of the mirror, to which electrical power is supplied;
a seal portion, integrally provided at the retaining member, that seals the supply section; and
a press contact portion that is integrally provided at at least one of the seal portion or a portion, which is integrated with the seal portion, of the retaining member, the press contact portion making press contact with a member provided at a vehicle body side,
wherein the mirror and the seal portion are integrated together, and an end face, at a side of the mirror, of the seal portion is fitted to the back face of the mirror.

2. A vehicle mirror device comprising:
a retaining member, provided at a back face side of a vehicle mirror, that retains the mirror;
a supply section, provided at the back face side of the mirror, to which electrical power is supplied;
a seal portion, integrally provided at the retaining member, that seals the supply section; and
a press contact portion that is integrally provided at at least one of the seal portion or a portion, which is integrated with the seal portion, of the retaining member, the press contact portion making press contact with a member provided at a vehicle body side,
wherein the seal portion includes:
a first seal portion that covers the supply section; and
a second seal portion that covers the first seal portion.

3. The vehicle mirror device of claim 2, wherein end faces, at a side of the mirror, of the first and second seal portions are fitted to the back face of the mirror.

4. The vehicle mirror device of claim 3, wherein:
the first seal portion is a case that accommodates the supply section; and
the second seal portion is a sealing agent having adhesive and sealing properties.

5. A vehicle mirror device comprising:
a retaining member, provided at a back face side of a vehicle mirror, that retains the mirror;
a supply section, provided at the back face side of the mirror, to which electrical power is supplied; and a seal portion, integrally provided at the retaining member, that seals the supply section, wherein a portion, which is integrated with the seal portion, of the retaining member is integrally overlapped with a member provided at a vehicle body side, wherein the seal portion includes:

a first seal portion that covers the supply section; and a second seal portion that covers the first seal portion.

6. The vehicle mirror device of claim 5, wherein the mirror and the seal portion are integrated together.

7. The vehicle mirror device of claim 5, wherein end faces, at a side of the mirror, of the first and second seal portions are fitted to the back face of the mirror.

8. The vehicle mirror device of claim 7, wherein:

the first seal portion is a case that accommodates the supply section; and the second seal portion is a sealing agent having adhesive and sealing properties.

\* \* \* \* \*